3,268,546
CERTAIN 2-BENZOXAZOLINONE COMPOUNDS HAVING METHOXY AND HALO SUBSTITUENTS
Cornelius Kennady Cain, Flourtown, and James Nelson Plampin, Roslyn, Pa., assignors to McNeil Laboratories, Incorporated, a corporation of Pennsylvania
No Drawing. Filed May 12, 1964, Ser. No. 366,895
5 Claims. (Cl. 260—307)

This application is a continuation-in-part of copending application Serial No. 247,542, filed December 27, 1962, and subsequently abandoned.

This invention relates to novel benzoxazolinones and basic salts thereof having hypotensive activity, to compositions containing same, to methods of preparing such benzoxazolinones and salts, and to methods of lowering blood pressure by the administration thereof.

The novel benzoxazolinones of this invention may be denoted as 5-R-6-$R_1$-2-benzoxazolinones wherein R and $R_1$ are each different and selected from the group consisting of methoxy and halo, said halo being bromo or chloro. The novel benzoxazolinones may be illustrated as follows:

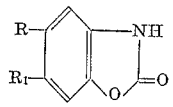

The novel 5-chloro-6-methoxy-2-benzoxazolinone may be prepared by reducing 4-chloro-6-nitrosoresorcinol to 4-amino-6-chlororesorcinol and treating the latter in situ with cyanogen bromide to give 2-amino-5-chloro-6-hydroxybenzoxazole. Methylation of 2-amino-5-chloro-6-hydroxybenzoxazole, preferably with dimethylsulfate and an alkali metal hydroxide such as sodium hydroxide or potassium hydroxide, gives 2-amino-5-chloro-6-methoxybenzoxazole which on hydrolysis in an aqueous, strong inorganic acid such as hydrochloric acid, sulfuric acid or phosphoric acid, advantageously under reflux conditions, gives the desired 5-chloro-6-methoxy-2-benzoxazolinone.

Either 4-chloro-6-nitrosoresorcinol or 4-chloro-6-nitroresorcinol may be reduced to the 4-amino-6-chlororesorcinol by means of hydrogen catalytically activated by platinum, palladium or nickel catalyst such as platinum oxide or Raney nickel, which is the preferred method, or by hydrogen in statu nascendi, that is reduction with metals and acids, for example iron, zinc or tin, such as zinc and acetic acid; with alkali metals and alcohols, for example sodium and ethanol or butanol; with sodium and moist ether; with sodium or aluminum amalgam and the appropriate solvent, or with di-light metal hydrides such as lithium aluminum hydride, sodium aluminum hydride, magnesium hydride in the presence of a catalyst such as aluminum chloride.

Alternatively, the novel 5-chloro-6-methoxy-2-benzoxazolinone may be prepared by reduction of 4-chloro-5-methoxy-2-nitrosophenol, in accordance with one of the techniques described above, the 4-chloro-5-methoxy-2-aminophenol which on treatment with phosgene gives the desired 5-chloro-6-methoxy-2-benzoxazolinone. Selective methylation of 5-chloro-6-hydroxy-2-benzoxazolinone also results in the desired 5-chloro-6-methoxy-2-benzoxazolinone. The 5-chloro-6-hydroxy-2-benzoxazolinone is prepared by phosgene treatment of 4-amino-6-chlororesorcinol.

Still another method which may be used for preparing the novel 5-chloro-6-methoxy-2-benzoxazolinone comprises nitration of 5-chloro-2-benzoxazolinone to give the corresponding 6-nitro derivative which, upon reduction, yields the 6-amino compound. Diazotization of the latter and transformation of the diazonium salt yields the desired 5-chloro-6-methoxy-2-benzoxazolinone.

The subject 5-halo-6-methoxy-2-benzoxazolinones, wherein halo is either bromo or chloro, may be prepared by reacting 6-methoxy-2-benzoxazolinone with either bromine or chlorine, respectively, in an inert organic solvent containing a catalytic amount of a Lewis acid, preferably at temperatures ranging from about —10° C. to about 50° C. The halogen may simply be bubbled through the reaction mixture or it may be added in solution form, preferably utilizing, where possible, the same organic solvent that is employed in carrying out the reaction. Typical Lewis acids are aluminum chloride, ferric chloride and the like. Also suitable are materials which form Lewis acids in situ upon reaction with bromine or chlorine, e.g., iron, sulfur, phosphorous and the like.

The subject 6-halo-5-methoxy-2-benzoxazolinones may be prepared by reacting 5-methoxy-2-benzoxazolinone with either chlorine or bromine in an inert organic solvent, to yield, resectively, the corresponding 6-chloro- and 6-bromo derivative of 5-methoxy-2-benzoxazolinone.

Typical inert organic solvents for the foregoing reactions include liquid polyhalogenated aliphatic hydrocarbons, e.g., chloroform, carbon tetrachlorides, dichloromethane, dibromoethane, ethylene chloride, butyl chloride and the like; lower aliphatic alcohols, e.g., methanol, ethanol, isopropanol, tertiary butanol and the like; and lower aliphatic saturated ethers, e.g., ethyl ether, isopropyl ether, 1,4-dioxane and the like.

The subject 2-benzoxazolinones may be converted to the corresponding therapeutically active salt form by dissolution in an aqueous alkali metal or alkaline earth metal hydroxide or carbonate such as sodium hydroxide, potassium hydroxide, sodium carbonate, potassium carbonate or similar base.

The compounds of this invention have been found to possess hypotensive properties. For example, the administration of 50 mg./kg. body weight of 5-chloro-6-methoxy-2-benzoxazolinone by the intraduodenal route to an anesthetized dog resulted in a fall in blood pressure which was observed within a period of less than four minutes, the decrease reching a maximum of 92 mm. of mercury in a period of about 80 minutes. The blood pressure then rose slowly over a period of several hours but did not reach the pre-treatment level in more than five hours following administration of the compound. There was no appreciable change in respiration and pulse rate during the experimental period. Thus, the compound has been shown to possess long-acting, hypotensive properties.

In Table I below, the results of blood pressure decreases in anesthetized dogs following intraduodenal administration of the subject compounds dissolved in one equivalent of aqueous sodium hydroxide are shown. The data therein illustrate the useful hypotensive activity of the subject compounds on animals. In contrast, there is a significant absence or insignificant degree of hypotensive properties in known closely related compounds, as also shown in Table I. Controls I and II were run using equal volumes of an aqueous solution of sodium hydroxide containing the same amount of sodium hydroxide as was used in experiments No. 2 and 3 respectively. Control III was run using isotonic saline solution of the same volume as in experiment No. 2.

This invention thus provides a process for lowering blood pressure in mammals which comprises internally administering to said mammals an effective amount of the subject benzoxazolinones or the alkali metal and alkaline earth metal salts thereof. The preferred benzoxazolinone is 5-chloro-6-methoxy-2-benzoxazolinone.

According to this invention, pharmaceutical compositions suitable for lowering blood pressure in mammals are provided which comprise the subject 5-R-6-$R_1$-2-benzoxazolinones or salts thereof as the active hypotensive ingredient and pharmaceutical carriers known for the production of formulations suitable for oral or parenteral administration. The active ingredient is preferably present in the composition such that the proportion by weight of active ingredient in the formulation to be administered is at least 1%.

administration of such dosage units from 1 to 6 times daily depending upon the age, weight and condition of the subjects to be treated. The preferred route of administration is by oral ingestion, and, preferably, the dosage is taken in the form of a tablet or capsule.

The following examples serve to illustrate the invention:

TABLE I

| Expt. No. | 2-benzoxazolinone Derivative | Pre-drug B.P. (mm. Hg) | Dose, mg./Kg. | Maximum decrease in B.P. (mm. Hg) | Duration of B.P. decrease |
|---|---|---|---|---|---|
| 1 | 5-chloro-6-methoxy | 130 | 200 | 102 | >4 hr., 25 min. |
| 2 | do | 144 | 100 | 94 | >4 hr., 30 min. |
| 3 | do | 146 | 50 | 92 | >5 hr., 15 min. |
| 4 | do | 125 | 50 | 70 | >4 hr., 45 min. |
| 5 | do | 130 | 25 | 50 | 2 hr., 30 min. |
| 6 | 5-bromo-6-methoxy | 125 | 50 | 55 | >6 hr. |
| 7 | 5-methoxy-6-chloro | 120 | 50 | 35 | 4 hr. |
| 8 | 5-methoxy-6-bromo | 142 | 50 | 67 | >3 hr., 30 min. |
| 9 | do | 140 | 50 | 52 | >3 hr., 30 min. |
| Known Compounds | | | | | |
| 10 | 5,6-dichloro | 160 | 30 | [1] | [1] |
| 11 | 5-chloro-6-ethoxy | 115 | 50 | 10 | 30 min. |
| 12 | do | 115 | 50 | 5 | 30 min. |
| 13 | 5-methoxy | 110 | 50 | [1] | [1] |
| 14 | 6-methoxy | 105 | 50 | 15 | >2 hr., 15 min. |
| Controls | | | | | |
| 15 | I | 150 | | 15 | 33 min. |
| 16 | II | 150 | | 20 | 42 min. |
| 17 | III | 160 | | [1] | [1] |

[1] No effect.

It is especially advantageous to formulate the subject compounds in dosage unit form for ease of administration and uniformity of dosage. "Dosage unit form," as used herein, refers to physically discrete units suitable as unitary dosages, each unit containing a predetermined quantity of active material calculated to produce the desired therapeutic effect in association with the required pharmaceutical carrier. Examples of such dosage unit forms are tablets, capsules, pills, powder packets, wafers, cachets, lozenges, teaspoonfuls, tablespoonfuls and the like and segregated multiples thereof. Although such dosage unit forms are suitable for oral ingestion and are the preferred embodiments of this invention, dosage unit forms of parenteral solutions, e.g. single or multiple dose ampoules, to be administered by intramuscular intravenous injections, may be advantageously employed.

The dosage unit forms of the present invention may be formulated in accordance with conventional practices well-known in the art. In general they are prepared by formulating the therapeutically active 5-R-6-$R_1$-2-benzoxazolinone or salts thereof with the required non-toxic, pharmaceutical carriers. Such carriers include those commonly employed in pharmaceutical practice and comprise, for example, in the case of orally-ingestible solid dosage unit forms, diluents, binders, lubricants, disintegrators, flavors and the like. In the case of orally-ingestible liquid dosage unit forms, said carriers comprise water, edible oils, alcohol, glycol, colors, flavors, sweeteners, suspending agents, surfactants, preservatives and the like. In the case of injectables, including solutions and suspensions, said carriers comprise the commonly employed sterile, pyrogen-free parenteral fluids such as Water for Injection, U.S.P., vegetable oils, e.g., peanut oil and sesame oil, and the like. Sterile suspending agents may also be formulated in such injectables, if required.

In accordance with this invention, the aforementioned pharmaceutical preparations suitably comprise from about 5 to about 500 milligrams of 5-R-6-$R_1$-2-benzoxazolinone or the therapeutically active salts thereof per dosage unit form. The liquid compositions suitably comprise from about 1 to about 100 milligrams of said active ingredients per milliliter. The process of this invention involves the

*Example 1*

4-chlororesorcinol (14.4 grams) is dissolved in a solution of sodium ethoxide prepared from 2.3 grams of sodium and 100 mls. of anhydrous ethanol. The resulting solution is cooled to 0° C. and treated with a solution of 10.3 grams of butyl nitrite in 10 mls. of anhydrous ethanol. The dark reaction mixture is stirred for three hours at 0° C. then poured into 300 mls. of water. Neutralization of the dark solution with hydrochloric acid gives a yellow precipitate which is recrystallized from aqueous ethanol to give 4-chloro-6-nitrosoresorcinol as yellow crystals which slowly decompose without melting upon heating.

A solution of cyanogen bromide in methanol is prepared by slowly adding 17.6 grams of bromine to 5.4 grams of sodium cyanide in 200 mls. of methanol. The air in the flask is displaced with nitrogen and a solution of 4-amino-6-chlororesorcinol (prepared by shaking at room temperature a solution of 17.3 grams of 4-chloro-6-nitrosoresorcinol in 200 mls. of methanol with hydrogen under a pressure of 2.8 kg./cm.$^2$ and 2 grams of 10% palladium-charcoal catalyst until 0.2 mole of hydrogen is absorbed) is added rapidly with stirring. The reaction mixture is heated quickly to reflux and allowed to cool to room temperature. The solution is neutralized with sodium bicarbonate solution, and most of the methanol is removed by distillation under reduced pressure. The black precipitate is purified by several recrystallizations from methanol after treatment with Norite A to give 2-amino-5-chloro-6-hydroxybenzoxazole as colorless crystals, melting point 215–217° C. (dec.).

A suspension of 5.0 grams of 2-amino-5-chloro-6-hydroxybenzoxazole in 25 mls. of water is cooled to 0–5° C. and treated with a solution of 1.2 grams of sodium hydroxide in 25 mls. of water to give a dark blue solution to which is added slowly 4.0 grams of dimethylsulfate. The ice bath is removed and stirring is continued until the mixture is neutral to litmus. The precipitate is collected, washed with water and purified by crystallization from a mixture of acetone and benzene to give 2-amino-5-chloro-6-methoxybenzoxazole as colorless crystals which decompose from 195–215° C.

A solution of 1.0 gram of 2-amino-5-chloro-6-methoxybenzoxazole in 25 mls. of 2 N hydrochloric acid is refluxed for four hours. The precipitate is collected and purified by three recrystallizations from methanol to give 5-chloro-6-methoxy-2-benzoxazolinone, melting point 225–227° C.

*Example II*

A solution of 4-amino-6-chlororesorcinol is prepared as described above, using ethyl acetate in place of methanol. This solution is transferred under nitrogen to a flask containing 18 grams of sodium acetate in 100 mls. of ethyl acetate. The mixture is stirred and treated rapidly with a solution of 9.8 grams of phosgene in 20 mls. of ethyl acetate. The reaction mixture is heated to reflux and then allowed to cool to room temperature. Water is added, the organic layer is separated, and the aqueous layer is extracted with ether. The combined organic solution is washed with dilute sodium bicarbonate solution then with dilute hydrochloric acid and finally with water. The solution is dried over anhydrous magnesium sulfate and evaporated under reduced pressure to give 15 grams of crude red product which is purified by several recrystallizations from methanol after treatment with Darco to give 5-chloro-6-hydroxy-2-benzoxazolinone as colorless crystals, melting point 245–247° C., which by means of selective methylation gives the desired 5-chloro-6-methoxy-2-benzoxazolinone.

*Example III*

A mixture of 56 g. of (0.34 mole) of 6-methoxy-2-benzoxazolinone, 1 liter of chloroform and 1 g. (0.018 mole) of iron filings is cooled to 10–15° C. in an ice bath and treated with a solution of 47.6 g. (0.68 mole) of chlorine in 200 ml. of chloroform. The mixture is stirred and the temperature is maintained at 10–20° C. during the addition of chlorine and for 30 minutes afterward, after which the volume is reduced to approximately one-half by distillation under reduced pressure. The solid is collected by filtration and washed with chloroform. Recrystallization from methanol after treatment with charcoal gives white crystals of 5-chloro-6-methoxy-2-benzoxazolinone, M.P. 226–228° C. The calculated nitrogen content of $C_8H_6ClNO_3$ is 7.02%; that found is 6.93%.

*Example IV*

The procedure of Example III is followed, except that an equivalent quantity of bromine is used in lieu of chlorine to yield the product 5-bromo-6-methoxy-benzoxazolinone, M.P. 239–240° C. The calculated nitrogen content of $C_8H_6BrNO_3$ is 5.7%; that found is 5.6%.

*Example V*

To a suspension of 8.7 g. (0.045 mole) of 5-methoxy-2-benzoxazolinone in 100 ml. of chloroform is added with stirring a solution of 3.0 g. (0.045 mole) of chlorine in 30 ml. of chloroform. The temperature of the stirred reaction mixture is held between 15° and 25° during the addition and for 6 hours after addition is complete. Evaporation of the chloroform and purification of the residue by crystallization from a mixture of acetone and water with the use of charcoal gives 6-chloro-5-methoxy-2-benzoxazolinone, M.P. 178–179° C. The calculated nitrogen content of $C_8H_6ClNO_3$ is N, 7.02%; that found is 7.28%.

*Example VI*

The procedure of Example V is followed except that an equivalent quantity of bromine is used in lieu of chlorine to yield 6-bromo-5-methoxy-2-benzoxazolinone, M.P. 201–203° C. The calculated nitrogen content of $$C_8H_6BrNO_3$$

is N, 5.74%; that found is N, 5.84%.

*Example VII*

Stoichiometric quantities of 5-chloro-6-methoxy-2-benzoxazolinone and sodium hydroxide are dissolved in water. Evaporation of the aqueous solvent yields the corresponding sodium salt of 5-chloro-6-methoxy-2-benzoxazolinone. In a similar fashion, but using calcium hydroxide in lieu of the sodium hydroxide, the corresponding calcium salt is obtained.

*Example VIII.—Capsules*

Capsules are made by filling hard shell gelatin capsules with a mixture of 100 mg. of 5-bromo-6-methoxy-2-benzoxazolinone and 100 mg. of lactose so that each capsule contains 100 mg. of the benzoxazolinone.

*Example IX.—Tablets*

Formula for 1,000 tablets:

| | Grams |
|---|---|
| 5-chloro-6-methoxy-2-benzoaxazolinone | 50 |
| Lactose | 50 |
| Starch | 50 |
| Dibasic calcium phosphate | 148 |
| Calcium stearate | 2 |

All the ingredients are blended together and compressed into tablets weighing 300 mg. each.

*Example X.—Oral liquid*

Formula for 5000 mls.:

| | | |
|---|---|---|
| 5-chloro-6-methoxy-2-benzoxazolinone | g | 50 |
| Alcohol, U.S.P. | ml | 350 |
| Propylene glycol | ml | 1000 |
| Sodium saccharin | g | 5 |
| Sugar | g | 500 |
| Flavor | ml | 25 |
| Color | g | 5 |
| Water, add to make | ml | 5000 |

Each teaspoonful (5 mls.) of the above liquid formulation contains 50 mg. of the benzoxazolinone.

What is claimed is:
1. A member selected from the group consisting of 5-R-6-$R_1$-2-benzoxazolinone and the alkali metal and alkaline earth metal salts thereof wherein R and $R_1$ are different and selected from the group consisting of methoxy and halo, said halo being selected from the group consisting of bromo and chloro.
2. 5-chloro-6-methoxy-2-benzoxazolinone.
3. 5-bromo-6-methoxy-2-benzoxazolinone.
4. 5-methoxy-6-chloro-2-benzoxazolinone.
5. 5-methoxy-6-bromo-2-benzoxazolinone.

References Cited by the Examiner

UNITED STATES PATENTS

| | | | |
|---|---|---|---|
| 2,922,794 | 1/1960 | Model et al. | 260—307 |
| 2,987,442 | 6/1961 | McLean et al. | 167—65 |
| 3,062,828 | 11/1962 | Lunsford | 260—307 |
| 3,067,101 | 12/1962 | Easton et al. | 167—65 |
| 3,179,667 | 4/1965 | Walles | 260—307 |

OTHER REFERENCES

Kinugawa et al., Chem. Abstr., volume 54, page 497e, 1960.

HENRY R. JILES, *Acting Primary Examiner.*

FRANK CACCIAPAGLIA, JR., *Examiner.*

ALTON D. ROLLINS, *Assistant Examiner.*